United States Patent [19]

Fetherston et al.

[11] 3,879,245
[45] Apr. 22, 1975

[54] METHOD OF MAKING COMPOSITE CORED STRUCTURES

[75] Inventors: William H. Fetherston, Bellevue; Roger C. Teeter, Redmond, both of Wash.

[73] Assignee: Composite Structures Corporation, Bellevue, Wash.

[22] Filed: June 27, 1972

[21] Appl. No.: 266,645

[52] U.S. Cl. ............... 156/245; 264/241; 264/276; 264/320; 264/321
[51] Int. Cl. .............................................. B29c 3/00
[58] Field of Search .......... 156/245, 197, 213, 216, 156/228; 264/45, 241, 257, 266, 271, 273, 276, 320, 321; 9/310 R, 310 B, 310 E; 280/11.13 L

[56] References Cited
UNITED STATES PATENTS

| | | | |
|---|---|---|---|
| 2,630,868 | 3/1953 | Ellenberger | 156/245 |
| 3,027,575 | 4/1962 | Fortin | 9/310 A |
| 3,276,784 | 10/1966 | Anderson | 9/310 A |

*Primary Examiner*—Charles E. Van Horn
*Assistant Examiner*—Caleb Weston
*Attorney, Agent, or Firm*—Morris A. Case

[57] ABSTRACT

A core is completely encased in reinforced plastic to form a structural part. A part is made in a pair of matched metal dies one of which moves against the other to form a mold to contain, and to apply pressure to the part and pinch off excess cover material. Part is made up with cover material above and below core material. Excess cover material wraps around the core when placed in the mold, the part is heated and the mold closed at the time the resin in the cover material starts to set up.

27 Claims, 12 Drawing Figures

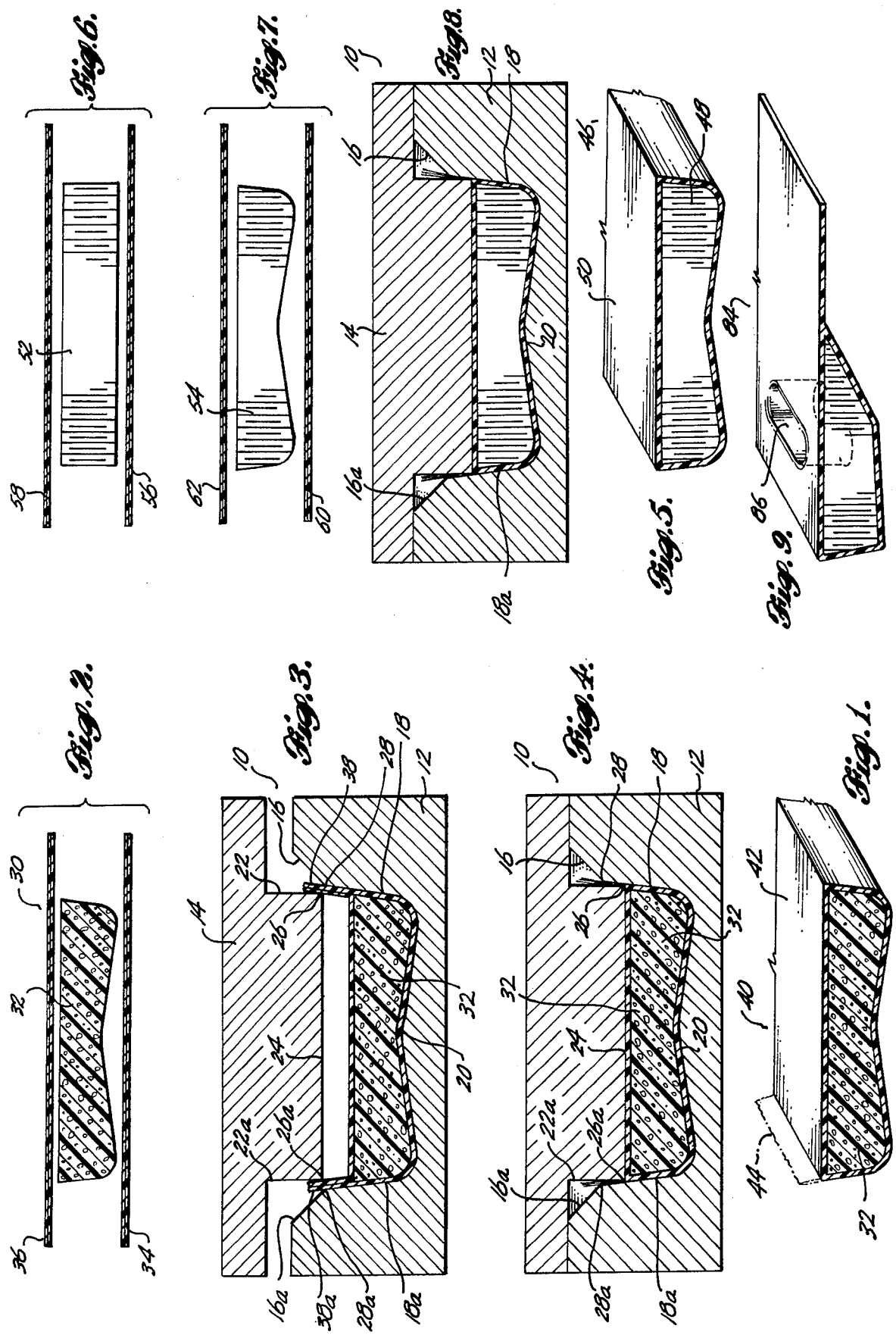

METHOD OF MAKING COMPOSITE CORED STRUCTURES

BACKGROUND OF THE INVENTION

The instant invention is an improvement on the process disclosed in our patent application Ser. No. 107,063, filed Jan. 18, 1971, now abandoned.

Honeycomb cored structural parts are generally made in steps of first adhering a reinforced material to the upper and lower surfaces of the honeycomb and then fastening an adhering cover to the edges. This additional step required to cover the edges is both expensive and a potential source of difficulties.

Completely covering a core material with a structurally reinforced resin and molding in a normal compression mold is time consuming and expensive. First the core is prepared properly undersized and next the covering material is built up to give just the right amount of material to fill the mold without having an excess. Care and experience is required to lay-up the part properly to prevent voids in some areas and excess in others; which may require rejection of the part or the voids may require filling and or the excess may require grinding, all of which is expensive. The problem is increased when the part has compound curves. One way to ease the problem is to increase molding pressures to even out a lack or an excess of cover material, but pressure also adds to the cost and it is often not the answer.

SUMMARY OF THE INVENTION

It was found that reinforced resin encased cores could be quickly and easily produced using a combination of proper matching dies designed for use in a heated molding press; along with a simple lay-up technique and press operation. In the matching metal dies the lower die has a recess the lower surface of which may have compound curves. All of the sides of the recess in the lower die are canted outwardly and upwardly for a distance at least one quarter inch above a line defined by the upper edge of the outer side of a part prepared in the die, above which line the sides of the recess extend outwardly and upwardly at a more widely diverging angle.

The upper matching die has a downwardly extending projection which extends into the recess of the lower die at an angle between 2° and 10° in relation to the lower canted sides. The extension in the upper die when fully inserted contacts the lower canted sides of the lower die. A lay-up part is prepared with a core of materials such as a foamed plastic, balsa wood, or honeycomb. Layers of structurally reinforced resins may be wrapped around the core or may preferably be placed on top and bottom of the core. The layers extend beyond the core to provide materials to completely fill the mold and completely encase the core when compressed between the matched dies. The part is placed in the lower die and the upper die brought into contact with the lay-up part. As the dies approach each other the cover material is wrapped around the core with the excess of material extending between the matching sides of the dies. The dies are held in contact with the lay-up until the heat in the dies cause the resin to start to set-up at which time the dies are brought together and held together until the resin is cured. The time before complete closing varies with the type and condition of the resin.

An epoxy, polyester phenolic, or polyurethane resin is preferred, however as any thermosetting resin will work in this process it is not our desire to be limited to the above resins. An additional nonstructural coat may be used of a thermoplastic resin such as acrylic, vinyl, acrylo-nitrile, butadiene, or styrene. When the two parts of the matching dies are contacting each other this serves to pinch off the excess cover material, or flashing, and reduce its thickness to a few thousands along a line where the flashing extends from the molded part. This facilitates an easy removal of the flashing. A light sanding along the line where the flashing was removed, finishes the part.

When using a honeycomb core the layers of structurally reinforced resin adjacent to the top and bottom surfaces of the honeycomb use a preimpregnated reinforcement wherein the resin is advanced to the "B" stage. This limits the flow of the resin when it is heated. The "B" stage resin flows to adhere to the open ends of the honeycomb, but does not fill the voids.

It was found a honeycomb core completely encased with a structurally reinforced plastic may be made in conventional compression molds, not having the pinch off features, when using the disclosed processes, however, the processes using the pinch off type of matching metal molds are preferred.

It is an object of this invention to obtain a structural part with one step molding.

It is another object to define a pair of matching dies for use in compression molding by containing a lay-up part allowing for removal of excess and for pinching off flashing.

It is another object to provide a method of preparing a composite part with a core material encased in a reinforced resin in a one mold step.

It is another object to provide a method of preparing a composite part with a honeycomb core material completely encased in a reinforced resin in a one mold step without filling the voids in the honeycomb.

Other objects and various advantages of the disclosure will be apparent from the detailed description.

DESCRIPTION OF THE DRAWINGS

FIG. 1, is a fragmented perspective view of a water ski with a foamed polymer core.

FIG. 2, is a sectional end view of a lay-up part for the water ski of FIG. 1.

FIG. 3, is a sectional end view of the lay-up part of FIG. 2, positioned in a pair of matching metal dies.

FIG. 4, is a sectional end view of the layed up part of FIG. 2, with the matching metal dies contacting to form a mold cavity.

FIG. 5, is a fragmented perspective view of a water ski with a honeycomb core.

FIG. 6, is a sectional end view of a lay-up part for a water ski having a honeycomb core that is not preformed.

FIG. 7, is a sectional end view of a lay-up part for a water ski having a preformed honeycomb core.

FIG. 8, is a sectional end view of a composite water ski, having a honeycomb core, positioned for forming in a pair of matched metal dies.

FIG. 9, is a fragmented perspective view of a composite structure with a honeycomb core encased in a structurally reinforced resin.

DETAILED DESCRIPTION

Figure 10:
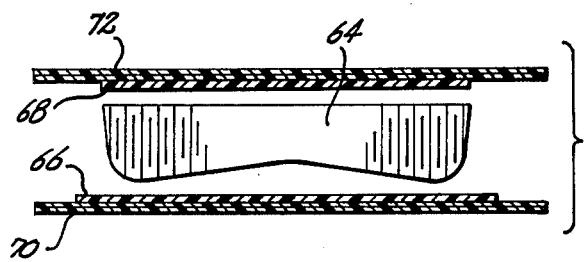
FIG. 10, is a sectional end view of a lay-up part for a water ski having a preformed honeycomb core, wherein the layers of structural reinforcing material adjacent to the honeycomb are of a width to just cover the top and bottom surfaces of the honeycomb.

Matching metal dies 10, with lower die 12, and upper die 14, are best illustrated in FIGS. 3 and 4.

In those FIGS. the lower die 12, has a cavity extending downwardly and inwardly with two stepped, canted sides. The upper canted sides 16, and 16a, each having a wide angle to the vertical and the lower canted sides 18, and 18a, canted at an angle required to define the sides of a part to be molded. The lower surface 20, of the lower die recess defines the bottom of a part to be formed. This surface may be straight, curved or may have a compound curvature.

The upper die 14, projects downwardly into the lower die recess with downwardly extending sides 22, and 22a. These sides are fixed at an angle with relation to the lower canted sides 18, and 18a, of from between 2° and 10°. Sides 22, and 22a, may be canted inwardly as required to retain this angle relationship with the lower canted sides of the recess in the lower die 12. In a preferred embodiment as shown in FIGS. 3 and 4 these sides are essentially vertical and sides 18, and 18a, are canted outwardly at about 7° from vertical. The lower extending surface 24, of the upper die defines the upper surface of a part to be made in the matched dies. This surface may be straight or have concave, convex or compound curvatures. The corners 26, and 26a, have a sharp edge and when the upper die is fully extended in the lower die these edges contact the sides 18, and 18a. The matching dies are heated and are mounted in a compression molding press, not shown, for molding core encased structural parts.

The juncture between the two stepped canted sides of the recess in the lower die shown at point 28, and 28a, respectively in these sectional views is a peripherical line which is at least one quarter inch above the line of contact between edges 26, and 26a, and canted sides 18, and 18a, when the upper die is fully extended into the lower die 12.

In FIG. 2, lay-up part 30, is made up of a core 32, preformed to the undersized shape of a finished ski. This core material may be of balsa wood, of a foamed polymerized resin or of honeycomb. In one preferred embodiment the core is a polymerized foamed polyurethane resin. A layer 34, of a structurally reinforced resin is placed below the core and another layer 36, above the core. These layers extend beyond the core to provide material for wrapping around the sides of the core, and to provide an excess of cover material. The structural reinforcement for the layers may be of dacron, cotton, or fiber glass to name a few materials that may be used for reinforcement. This may be in a single or in several layers but preferably it has multi-layers with the fibers in different layers arranged bilaterally, unilaterally and random. In one preferred embodiment the structural material is fiber glass. Veil mat, chopped fiber, random mat, unidirectional and bilateral cloth may be used. The reinforcement may be preimpregnated with a resin or may be impregnated with a catalyzed resin just prior to placing in the mold.

In one preferred embodiment the fibers are coated with a catalyzed epoxy resin. The core 32, when placed between the reinforcing layers 34, and 36, forms a lay-up part 30. The lay-up part is placed in heated lower die 12. The temperature of the die will be determined by the resin used. In this embodiment the die was at a temperature between 300°F and 310°F. Upon placing the lay-up part in the lower die and lowering the heated upper die 14, the layer 34, wrapped around the sides of the core 32, with the excess extending upward at 38, and 38a, between the sides of the two dies. The upper die when lowered is brought in contact with the lay-up part 30, and held in that position or it is fully extended then backed off a short distance then held in that position. The heat from the dies first causes the resin to flow and then to set-up or to cure. The upper die is held in contact with the lay-up part 30, till the resin starts to set-up at which time the upper die is brought down with edges 26, and 26a, against canted sides 18, and 18a, respectively. This contains the lay-up part in the mold while the resin is being cured. The resin is still somewhat fluid as it starts to set-up. As the dies approach one another the fluid resin is forced throughout the mold then contained and pressurized when the dies are completely closed. The period between first contacting the lay-up part with the upper die and completely inserting the upper die varies according to the resin, catalyst, accellerator, or combination thereof used. This time period at temperature required to cause the resin to start to set-up may be previously determined by experimentation in a small heated compression mold. In this embodiment the time period was 20 seconds.

FIG. 1, shows the finished composite ski 40, in section with core 32, now completely encased in cover 42. In this view flashing 44, has not yet been removed.

In another preferred embodiment a finished composite ski 46, shown in FIG. 5, has a honeycomb core 48, completely encased in a glass reinforced resin cover 50. The resin does not fill the voids in the honeycomb structure. Various honeycomb materials may be used with an aluminum honeycomb preferred due to its light weight and strength.

When utilizing this invention the honeycomb core need not be preformed. The honeycomb core shown in FIG. 6, will be crushed to shape in the mold defined by lower die 12, and upper die 14, at the same time the finished composite 46, is being formed.

In yet another embodiment, see FIG. 7, the honeycomb material 54, is cut to width and placed in the matching dies 12, and 14, prior to the lay-up to preform the honeycomb to shape. The honeycomb thus exactly defines the final shape of the ski and need not be undersized to allow room for cover material as additional crushing takes place when forming the final composite 46.

Structurally reinforced layers 56, and 58, of FIGS. 6 and 60, and 62, of FIG. 7, are preimpregnated with a resin advanced to the "B" stage. The same resins as set out earlier may be used as long as the resin is advanced to the "B" stage. The same procedures as earlier set out may not be used to form composite part 46. Closure time, of course, may vary due to the advanced stage of the resin.

Figure 11:
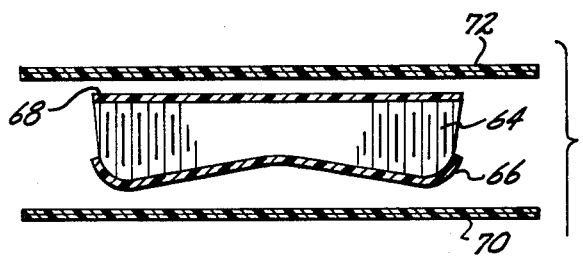
FIG. 11, is a sectional end view of the lay-up part of FIG. 10, illustrating the way the adjacent layers of reinforcing material will cover the surfaces of the honeycomb.

In yet another embodiment see FIG. 10, a formed honeycomb core 64, is placed between layers 66, and 68. These layers are of a preimpregnated structurally reinforced resin. The width of these layers are such that when positioned in the mold they will cover the top and bottom surfaces of the honeycomb in a manner as shown in FIG. 11. Structurally reinforced resin layers 70, and 72, are much wider than the honeycomb core to provide material to cover the edges of the honeycomb, fill the mold and provide flashing. layers 66, and 68, use a preimpregnated structural material with the resin advanced to the "B" stage. This adheres to and covers the open ends of the honeycomb without filling the voids. In one preferred embodiment the resin used is epoxy. Layers 70, and 72, may be preimpregnated or may be impregnated with a catalyzed resin just prior to placing in the dies. The resin in the reinforcement flows to fill the voids around the periphery of the sides of the honeycomb core. Layers 66, and 68, may be cut to a narrower width to leave the outer rows of honeycomb cells uncovered. An excess of resin will then be impregnated onto the layers 70, and 72, prior to placing the laylup in the dies and this excess resin will enter into and fill the voids in the outer rows of cells not covered by layers 68, and 70.

Aluminum honeycomb core material may be stabilized by heating the core for at least an hour at 250 degrees Fahrenheit, cooling, machining, placing a layer of preimpregnated structurally reinforced resin around the core and curing the resin while the part is contained in a heated and pressurized tool or mold. The honeycomb core may also be stabilized by adhering a preimpregnated structurally reinforced resin to one surface of the honeycomb then machining, and completely encasing in a preimpregnated structurally reinforcing material as above.

Figure 12:
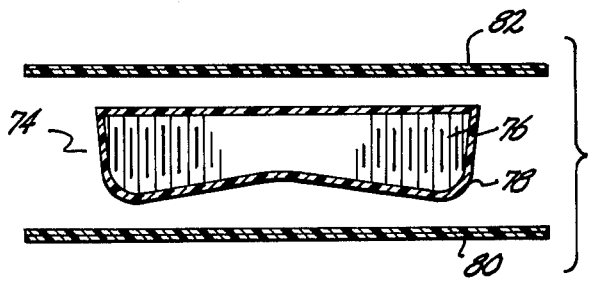
FIG. 12, is a sectional end view of a lay-up part for a water ski having a honeycomb core, wherein the entire surface of the honeycomb core is covered with a layer of cured reinforced resin material.

A stabilized honeycomb core 74, of honeycomb 76, and encasing cured reinforced resin cover 78, is shown in FIG. 12. The stabilized core is then covered with layer 80, below and layer 82, above. These layers are wide enough to extend beyond the width of the core to provide material for completely encasing the core when placed in the matching dies. The layers are preferably impregnated with a catalyzed liquid resin just prior to being placed in the dies. The layer 78, of preimpregnated structural materials is preferably of fiber glass having an outer layer of a nylon cloth (not shown). The outer layer assists in handling the honeycomb and will be peeled off prior to placement of the stabilized core 74, between reinforcing layers 80, and 82. Alternatively, layer 78 may be formed of a reinforcing material preimpregnated with a resin advanced to the "B" stage, which is placed above and below core 76, covered with layers 80 and 82 and formed into a structural member in matching dies in one step.

These methods may be used to form various structural composites. See part 84, of FIG. 9, of a honeycomb core material formed by the above outlined methods. Structural composites may be formed in the above one mole step process wherein the composite has a slot 86, extending from top to bottom surfaces of the part 84. Preimpregnated fiber glass resins with the resin advanced to the "B" stage is layed up around the edges of the slot when preparing the lay-up part. A metal insert, not shown, extends from one of the matching dies to mold the slot when the matching metal dies are brought together to mold a part. This insert extends from the bottom to the top of the mold cavity and has draft to allow for removal of the part after cure of the resin.

It is apparent that various modifications and various structures may be resorted to without departing from the principles of this invention as indicated by the scope of the following claims.

We claim:

1. A method of preparing a structural part having a honeycomb core encased in a structurally reinforced resin in a pair of heated matched metal dies held in a molding press, the steps comprising:
   a. covering a honeycomb core with a reinforcing material preimpregnated with a resin advanced to the "B" stage to form a lay-up part;
   b. inserting the lay-up part into a heated metal die;
   c. advancing a matching metal die until it makes contact with the lay-up part;
   d. holding the dies against the lay-up part until the resin starts to set-up;
   e. bringing the dies together to form a compression mold containing a formed part;
   f. holding the dies together until the resin in the part is cured; and
   g. covering the lay-up part with a layer of a thermoplastic resin prior to placing the part in the die.

2. A method of preparing a structural part having a honeycomb core encased in a structurally reinforced resin in a pair of heated matched metal dies held in a molding press, the steps comprising:
   a. covering a honeycomb core with a reinforcing material preimpregnated with a resin advanced to the "B" stage;
   b. placing structural material impregnated with a thermosetting resin above and below and extending beyond the covered core to form a lay-up part;
   c. inserting the lay-up part into a heated metal die;
   d. advancing a matching metal die until it makes contact with the lay-up part;
   e. holding the dies against the lay-up part until the resin starts to set-up;
   f. bringing the dies together to form a compression mold containing a formed part;
   g. holding the dies together until the resin in the part is cured; and
   h. covering the lay-up part with a layer of thermoplastic resin prior to placing the part in the die.

3. A method of compression molding a structural part of core material covered with reinforced plastics in one mold step in a mold having matching metal dies the lower die having a recess with outwardly canted sides and the upper die extending downward to contact the canted sides when fully closed, the steps comprising:
   a. using a core slightly undersize in relation to the final shape of a structural part, selected from the group of materials consisting essentially of polymerized foamed resins, balsa wood, and honeycomb;
   b. placing a thermosetting resin impregnated structural reinforcing material above and below and extending beyond the core to form a lay-up part;
   c. inserting the lay-up part in a heated metal lower die;
   d. advancing an upper matching heated metal die to contact the lay-up part;

e. holding the upper metal die in contact with the lay-up part so that heat from the heated matched metal die causes the thermosetting resin to flow;

f. closing the dies, when the resin starts to setup, to pinch off the excess resin reinforced materials and apply pressure as the resin in the part cures;

g. holding in the dies until the resin sets up; and h. placing a layer of a thermoplastic resin above and below the lay-up part prior to inserting said lay-up part in the heated metal lower die.

4. A one molding step process, for a honeycomb core encased in a reinforced plastic cover to form a structural part in a compression molding press having a pair of heated matching metal dies the steps comprising:

a. cutting honeycomb to a width of a finished part;

b. covering the honeycomb core with a structural material preimpregnated with a resin in the "B" stage to form a lay-up part;

c. inserting the lay-up part in a heated metal die having a recess with outwardly and upwardly extending canted sides;

d. lowering a heated upper die with essentially vertical sides, until the sides of the upper die contact the canted sides of the lower die;

e. backing out the upper die to just retain contact with the lay-up part to allow the resin to flow;

f. holding the dies against the lay-up part until the resin starts to set-up;

g. advancing the upper metal die until the lower edge of the upper die contacts the canted sides of the lower metal die to pinch off the excess material, crush the honeycomb to shape and contain the encased honeycomb under pressure to form the part; and h. leaving the formed part in the heated dies until the resin is cured.

5. A one molding step process, for a honeycomb core encased in a reinforced plastic cover to form a structural part in a compression molding press having a pair of heated matching metal dies the steps comprising:

a. cutting honeycomb to a width of a finished part;

b. covering the honeycomb core with a structural material preimpregnated with a resin in the "B" stage to form a lay-up part;

c. inserting the lay-up part in a heated metal die having a recess with outwardly and upwardly extending canted sides;

d. lowering an upper matching heated metal die, with essentially vertical sides, against the lay-up part;

e. holding the dies against the lay-up part until the resin starts to set-up;

f. advancing the upper metal die until the lower edge of the upper die contacts the canted sides of the lower metal die to pinch off the excess material, crush the honeycomb to shape and contain the encased honeycomb under pressure to form the part;

g. leaving the formed part in the heated dies until the resin is cured; and h. placing a layer of a thermoplastic resin above and below the lay-up part prior to inserting the lay-up part in the heated metal die.

6. A one molding step process, for a honeycomb core encased in a reinforced plastic cover to form a structural part in a compression molding press having a pair of heated matching metal dies the steps comprising;

a. cutting honeycomb to a width of a finished part;

b. covering the honeycomb core with a structural material preimpregnated with a resin in the "B" stage to form a lay-up part;

c. inserting the lay-up part in a heated metal die having a recess with outwardly and upwardly extending canted sides;

d. lowering an upper matching heated metal die, with essentially vertical sides, against the lay-up part;

e. holding the dies against the lay-up part until the resin starts to set-up;

f. advancing the upper metal die until the lower edge of the upper die contacts the canted sides of the lower metal die to pinch off the excess material, crush the honeycomb to shape and contain the encased honeycomb under pressure to form the part;

g. leaving the formed part in the heated dies until the resin is cured;

h. cutting a hole through the honeycomb at the time of cutting the honeycomb to width;

i. removing the preimpregnated structural material from above and below the hole cut in the honeycomb and laying up preimpregnated structural material around the edges of the hole in the honeycomb, prior to placing the lay-up part in the metal die; and j. using a formed metal insert located on one of the matching metal dies to mold the hole when the dies are joined.

7. A one molding step process, for a honeycomb core encased in a reinforced plastic cover to form a structural part in a compression molding press having a pair of heated matching metal dies the steps comprising:

a. cutting honeycomb to a width of a finished part;

b. covering the honeycomb core with a structural material preimpregnated with a resin in the "B" stage to form a lay-up part;

c. inserting the lay-up part in a heated metal die having a recess with outwardly and upwardly extending canted sides;

d. lowering an upper matching heated metal die, with essentially vertical sides, against the lay-up part;

e. holding the dies against the lay-up part until the resin starts to set-up;

f. advancing the upper metal die until the lower edge of the upper die contacts the canted sides of the lower metal die to pinch off the excess material, crush the honeycomb to shape and contain the encased honeycomb under pressure to form the part;

g. leaving the formed part in the heated dies until the resin is cured;

h. placing the cut to width honeycomb core in the matched metal dies to shape the core prior to covering with the preimpregnated structural material.

8. A method of compression molding a structural part of core material covered with reinforced plastics in one mold step in a mold having matching metal dies, the steps comprising:

a. using a core slightly undersize in relation to the final shape of a structural part, selected from the group of materials consisting essentially of polymerized foamed resins, and balsa wood;

b. placing a thermosetting resin impregnated structural reinforcing material above and below and extending beyond the core to form a lay-up part;

c. inserting the lay-up part in a heated metal lower die having a recess with outwardly and upwardly extending canted sides;

d. lowering a matching heated upper die having essentially vertical sides, until the sides of the upper die contact the canted sides of the lower die;

e. backing out the upper die to just retain contact with the lay-up part to allow the thermosetting resin to flow;

f. holding the upper metal die in contact with the lay-up part so that heat from the heated matched metal die causes the thermosetting resin to flow;

g. closing the dies, when the resin starts to set-up, to pinch off the excess resin reinforced materials and apply pressure as the resin in the part cures; and h. holding in the dies until the resin sets up.

9. A method of compression molding a structural part of core material covered with reinforced plastics in one mold step in a mold having matching metal dies, the steps comprising:

a. using a core slightly undersize in relation to the final shape of a structural part, selected from the group of materials consisting essentially of polymerized resins, and balsa wood;

b. placing a thermosetting resin impregnated structural reinforcing material above and below and extending beyond the core to form a lay-up part;

c. inserting the lay-up part in a heated metal lower die having a recess with outwardly and upwardly extending sides canted at about 2° to 7°;

d. advancing an upper matching heated metal die, having essentially vertical sides, to contact the lay-up part;

e. holding the upper metal die in contact with the lay-up part so that heat from the heated matched metal die causes the thermosetting resin to flow;

f. closing the dies, when the resin starts to set-up, to pinch off the excess resin reinforced materials and apply pressure as the resin in the part cures; and g. holding in the dies until the resin sets up.

10. A method as in claim 9, further comprising:

a. selecting foamed polyurethane as the polymerized foamed resin core;

b. utilizing glass fibers as the reinforcing materials and epoxy as the resin; and c. holding the matched metal dies at a temperature of about 300° to 310° F.

11. A one molding step process, for a honeycomb core encased in a reinforced plastic cover to form a structural part in a compression molding press having a pair of heated matching metal dies the steps comprising:

a. cutting honeycomb to a width of a finished part;

b. covering the honeycomb core with a structural material preimpregnated with a resin in the "B" stage to form a lay-up part;

c. inserting the lay-up part in a heated metal die having a recess with outwardly and upwardly extending canted sides;

d. lowering an upper matching heated metal die, with essentially vertical sides, against the lay-up part;

e. holding the dies against the lay-up part until the resin starts to set-up;

f. advancing the upper metal die until the lower edge of the upper die contacts the canted sides of the lower metal die to pinch off the excess material, crush the honeycomb to shape and contain the encased honeycomb under pressure to form the part; and g. leaving the formed part in the heated dies until the resin is cured.

12. A method as in claim 11, wherein the covering for the honeycomb core is obtained by placing a layer of the structurally reinforced preimpregnated material above and below and extending beyond the core to wrap around the core when matching dies are closed.

13. A method as in claim 11, with the additional step of placing a layer of a thermosetting resin above and below the lay-up part prior to inserting said lay-up part in the heated metal die.

14. A method of preparing a structural part, with a core of honeycomb and a covering of a structurally reinforced resin, in a pair of matched heated metal dies held in a molding press, the steps comprising:

a. cutting a honeycomb core to the width of a finished part;

b. placing a first layer of structural material preimpregnated, with a resin in the "B" stage, above and below the honeycomb, the preimpregnated structural material having a width sufficient to cover the top and bottom of the honeycomb while conforming to the shape of the top and bottom surfaces of the honeycomb core;

c. placing a second layer of a structural material impregnated with a resin above and below and extending beyond the honeycomb core with first layers of preimpregnated reinforcing material to form a lay-up part;

d. inserting the lay-up part in a heated metal die having a recess with outwardly and upwardly canted sides;

e. lowering an upper matching heated metal die, with sides extending downwardly at an angle of between two and ten degrees in relation to the canted sides of the lower metal die, to contact the lay-up part;

f. holding the dies in contact against the lay-up part until the resin in the preimpregnated structural material starts to set-up;

g. advancing the upper metal die until the edge of the extension of the upper die contacts the canted sides of the lower die, to form, contain, and pressurize a structural part and pinch off excess material; and h. leaving the formed part in the heated dies until the resin is cured.

15. A method as in claim 14, further comprising: placing a third layer of a thermoplastic resin above and below the lay-up part prior to inserting in the heated metal die.

16. A method as in claim 14, further steps comprising:

a. reducing the width of the first layers of structural material; and b. increasing the amount of resin in the second layers of structural reinforcing material to allow the excess resin to enter into and fill the honeycomb cells uncovered by the reduced width of the first layers of preimpregnated reinforcing material.

17. A method as in claim 14, further step comprising: selecting aluminum as the material for the honeycomb core, and fiber glass as the reinforcing material.

18. A method as in claim 14, the additional step of placing the cut to width honeycomb core between the pair of matched metal dies to crush the honeycomb to shape prior to covering with the first layers of reinforcing materials.

19. A method of preparing a structural part having a honeycomb core encased in a structurally reinforced resin in a pair of heated matched metal dies held in a molding press, the steps comprising:

a. heating aluminum honeycomb core at about 250°F for about an hour;
b. cooling the core;
c. machining the core material;
d. covering the core material with a layer of reinforcing material preimpregnated with a resin advanced to the "B" stage;
e. curing the resin while contained, to form a shaped covered core;
f. placing a structural material impregnated with a resin above and below and extending beyond the shaped covered core to form a lay-up part;
g. inserting the lay-up part in a heated metal lower die having upwardly and outwardly extending canted sides at between two and ten degrees from vertical;
h. advancing a matching upper heated metal die, having essentially vertically downward extending sides, until the upper die contacts the lay-up part;
i. holding the upper metal die against the lay-up part until the resin starts to set-up,
j. extending the upper die into the lower die to bring the edges of the downwardly extending upper die in contact with the canted sides of the lower die, to contain and pressurize the part being formed and to pinch off excess material; and
k. holding the dies together until the resin is fully cured.

20. A method as in claim 19, further comprising: selecting fiber glass as the reinforcing material.

21. A method as in claim 19, with the additional step of placing a layer of a thermoplastic resin above and below the lay-up part prior to placing it in the die.

22. A method of preparing a structural part having a honeycomb core encased in a structurally reinforced resin in a pair of heated matched metal dies held in a molding press, the steps comprising:

a. curing a layer of reinforcing material preimpregnated with a resin advanced to the "B" stage on one surface of a honeycomb core material;
b. machining the core material;
c. covering the remainder of the core material with a layer of reinforcing material preimpregnated with a resin advanced to the "B" stage;
d. curing the resin while contained to form a shaped covered core;
e. placing a structural material impregnated with a resin above and below and extending beyond the shaped covered core to form a lay-up part;
f. inserting the lay-up part in a heated metal lower die having upwardly and outwardly extending canted sides at between two and ten degrees from vertical;
g. advancing a matching upper heated metal die, having essentially vertically downward extending sides, until the upper die contacts the lay-up part;
h. holding the upper metal die against the lay-up part until the resin starts to set-up,
i. extending the upper die into the lower die to bring the edges of the downwardly extending upper die in contact with the canted sides of the lower die, to contain and pressurize the part being formed and to pinch off excess material; and
j. holding the dies together until the resin is cured.

23. A method as in claim 22, with the additional step of placing a layer of thermoplastic resin above and below the lay-up part prior to placing it in the die.

24. A method as in claim 22, further comprising: selecting fiber glass as the reinforcing material.

25. A method as in claim 24, further comprising: using aluminum as the honeycomb material.

26. A one molding step process for a ski having an aluminum honeycomb core encased in a reinforced plastic cover, molded in a molding press having a pair of heated matched metal dies, the steps comprising:

a. cutting the aluminum honeycomb core to a width of the finished part;
b. placing the cut aluminum honeycomb core between a pair of matched metal dies to crush the honeycomb to the shape of the ski;
c. covering and extending beyond the shaped core above and below with layers of unidirectional, bidirectional and random directional glass reinforcement preimpregnated with a "B" stage resin selected from materials consisting essentially of epoxy, polyester, and phenolic to form a lay-up part;
d. placing the lay-up part in a heated metal die having a recess with all sides canting outwardly and upwardly at an angle from about 2° to 10° from vertical;
e. advancing a second heated metal die, having essentially vertical downwardly extension for matching the first metal die, to contact the lay-up part;
f. holding the second metal die in contact with the lay-up part until the resin starts to set-up;
g. bringing the second die down until the edges of the upper extension contact the canted sides of the first die, to form and contain the lay-up part and pinch off the excess resin reinforced glass that extends upward between the sides of the two dies; and
h. holding the formed part in the heated matched metal dies until the resin is cured.

27. A method as in claim 26, further comprising:
a. selecting an epoxy as the resin; and
b. holding the matched metal dies at a temperature of about 300° to 310°F.

* * * * *